United States Patent [19]

Caruso

[11] Patent Number: 4,571,953
[45] Date of Patent: Feb. 25, 1986

[54] COMBINED REFRIGERATOR AND WATER FILTRATION UNIT

[76] Inventor: Louis F. Caruso, 1508 Viscaya Pkwy., Cape Coral, Fla. 33904

[21] Appl. No.: 699,728

[22] Filed: Feb. 8, 1985

[51] Int. Cl.[4] .............................................. F25D 23/12
[52] U.S. Cl. ...................................................... 62/339
[58] Field of Search ................. 62/718, 389, 338, 339, 62/440

[56] References Cited

U.S. PATENT DOCUMENTS

| | | | |
|---|---|---|---|
| 2,022,164 | 11/1935 | Sweetland | 62/339 X |
| 2,130,515 | 9/1938 | Tanner | 62/339 |
| 2,623,367 | 12/1952 | Morrison | 62/339 X |
| 2,785,546 | 3/1957 | Bauerlein | 62/339 X |
| 3,982,406 | 9/1976 | Hanson et al. | 62/339 |

*Primary Examiner*—Lloyd L. King
*Attorney, Agent, or Firm*—Alfred E. Wilson

[57] ABSTRACT

A small self contained refrigerator unit having a small water filtration unit in the refrigerator to provide filtered and cooled drinking water that is free from offensive odors and tastes, and is filtered to remove all offensive impurities. In thousands of business establishments and in homes the proprietors purchase bottled water, and have to contend with the inconvenience of lifting heavy bottles and periodically purchasing additional quantities of bottled water. By providing a small water treatment device in a refrigerator, the proprietor or homeowner is assured at all times of having cool good tasting water of better than bottle water quality for drinking and other purposes. It is unnecessary to open the refrigerator door to get drinking water because the delivery spout is conveniently located on top of the refrigerator which is low and provides a convenient work surface at table height.

1 Claim, 4 Drawing Figures

COMBINED REFRIGERATOR AND WATER FILTRATION UNIT

BACKGROUND OF THE INVENTION

This invention embodies a small refrigerator, preferably having a flat top surface substantially at normal table height to provide a convenient flat work surface. A small water filtration unit having a water storage reservoir is positioned in the refrigerator compartment to filter out water impurities and obnoxious odors, to insure a supply of pure water suitable for drinking.

FIELD OF THE INVENTION

The field and purpose of this development is to provide a small refrigerator which includes a small water purifier providing a source for the supply of cool drinking water of a desired degree of purity to comply with all Governmental regulations, and with which it is unnecessary to open the refrigerator door to provide drinking water.

DESCRIPTION OF THE PRIOR ART

Heretofore in order to provide cooled drinking water free from contaminants it was necessary to purchase processed bottled water and dispense the treated bottled water through an electrically actuated water cooler. The normal sized bottles of treated water available for use in electrically actuated water coolers contained five gallons, and were so heavy that many people could not handle them. As a result when the bottle went empty the drinking water could not be used until someone came who could handle the heavy bottle to load the cooler. A time lag was then encountered to permit the water to cool.

The desirability of having the convenience of a small refrigerator having a working surface at table top height, and which assembly could be relied on to provide good processed drinking water whenever needed satifies an urgent commercial demand.

SUMMARY OF THE INVENTION

The combination of a small refrigerator having water processing equipment therein to remove obnoxious elements from water and to purify it for drinking purposes supplies the demand for the combination of a refrigerator and drinking water for offices and homes.

DESCRIPTION OF THE PREFERRED EMBODIMENT

Figure 3:
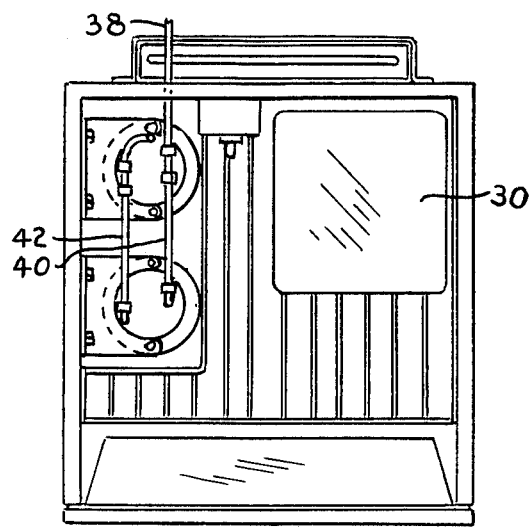
FIG. 3 is a sectional view taken substantially on the line 3—3 of FIG. 1, looking in the direction of the arrows.
Figure 4:
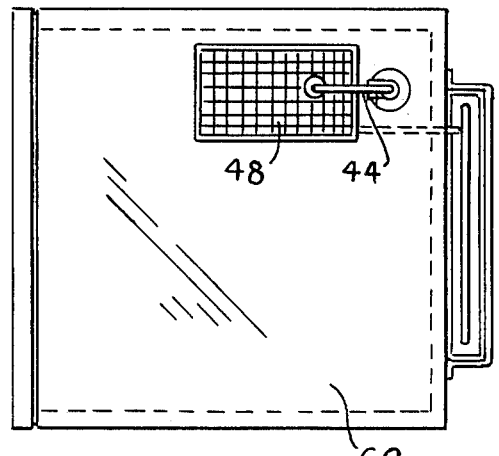
FIG. 4 is a top plan view of the refrigerator unit.
Figure 2:
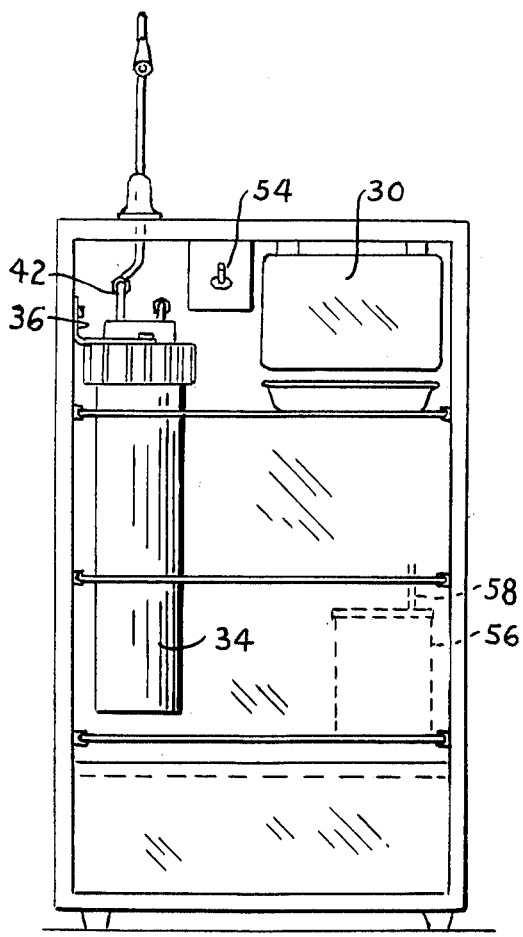
FIG. 2 is a sectional view taken substantially on the line 2—2 of FIG. 1 looking in the direction of the arrows.
Figure 1:
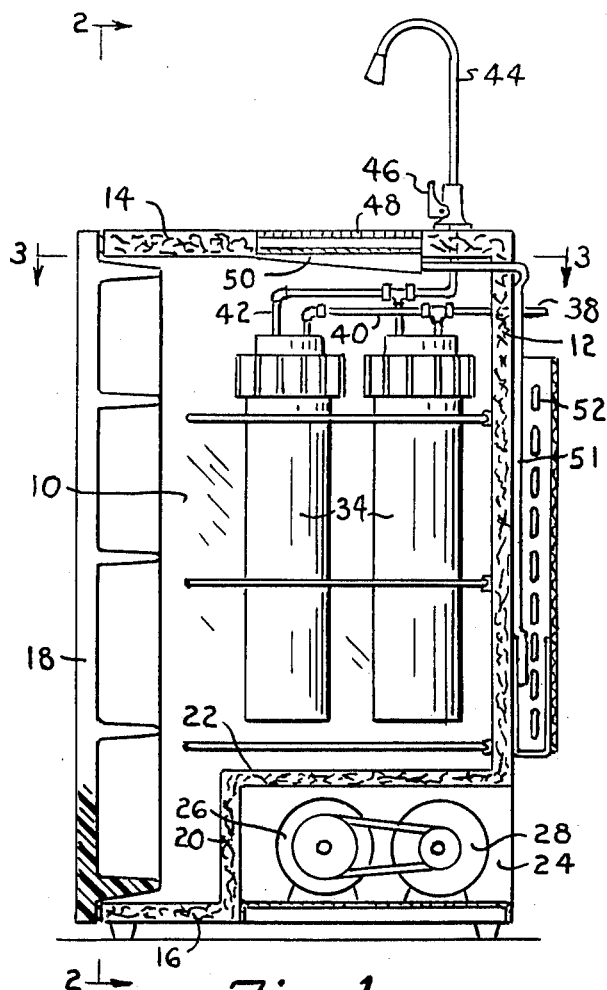
FIG. 1 is a sectional view of the refrigerator unit, and showing the water processing equipment therein.

Referring now to FIG. 1 the invention is disclosed as embodied in a refrigerator having a compartment 10 surrounded on three sides by suitable insulation 12, and by top and bottom insulation 14 and 16. The front of the compartment 10 is closed by a door 18 having suitable insulation and sealing against the sides and the top and bottom members 14 and 16. The bottom insulation 16 is contoured as shown at 20 and 22 to provide a compartment 24 for the reception of a compressor 26 driven by an electric motor 28. An ice freezing compartment 30 adapted to receive suitable ice trays to provide ice cubes is provided in the compartment 10. Suitable controls are provided to control the operation of the refrigerator in the usual manner.

Water processing equipment consisting of one or more chambers 34 are suitably positioned in the compartment 10, and are releasably secured therein by suitable brackets 36. The chambers 34 are operably connected to a water supply system, which may be from a well or from a public water system through a pipe 38. The chambers 34 are interconnected by a pipe 40 to supply unprocessed water to both of the chambers 34 when two chambers 34 are employed.

Any suitable water processing system may be embodied in the chambers 34, such for example as that provided by the Everpure Inc.

The chambers 34 of the water processing system are connected by suitable piping 42 with a Goose-neck dispensing pipe 44 controlled by a manually actuated control 46. It will be noted that where two chambers 34 are employed, as in the illustrated embodiment both chambers 34 are connected to the water supply pipe 38 to deliver unprocessed and uncooled water to the chambers 34. Also it will be noted that both chambers 34 are connected to the Gooseneck water dispensing pipe 44 by the pipe 42.

It will be noted that the gooseneck water dispensing pipe 44 overlays a perforated panel 48 overlaying a pan 50 angled downwardly and connected by a discharge pipe 51 discharging into the evaporator 52 of the refrigerator. A control 54 is provided to interrupt the operation of the water processing equipment installed in the chambers 34 when it is desired to change the chambers 34 to recharge them.

If desired, the water processing equipment, including the tanks 34 can be positioned outside of refrigerator compartment 10, and a container of suitable capacity 56, and of any desired shape can be positioned in the refrigerator compartment 10. That container can be connected by suitable piping 58 with the water processing equipment positioned outside of the refrigerator compartment 10, and it may also be connected to the gooseneck dispensing pipe 44 to dispense processed and cooled water.

The refrigerator unit has a top surface 60 at table height to render the combination of the refrigerator and the water processing equipment more adaptable and useful for many purposes.

Attention is directed to the fact that when filling the ice trays in the ice freezing compartment 30 the water to fill the ice trays should be taken from the gooseneck dispensing pipe 44 to get treated water which will make more pure ice. If the refrigerator unit is equipped with an automatic water dispenser or other equipment requiring water, the water should be taken from the water processing equipment embodied herein to insure the use of a better quality of treated water.

I claim:

1. The combination with a refrigerator having a rectangularly shaped cabinet including a substantially flat top, a gooseneck water dispensing pipe projecting upwardly in one corner of the substantially flat top and having a downwardly directed water outlet, a perforated panel aligned with the downwardly directed water outlet, a pan positioned beneath and angled downwardly beneath the perforated panel, a discharge pipe communicating with the downwardly angled pan to dispense water spilled on the perforated panel, a refrigerated compartment in the rectangularly shaped cabinet, a water purification system comprising a chamber for the reception of water purification equipment, inlet and outlet passages to the chamber of the water purification system, means to releasably clamp the water purification chamber in the refrigerated compartment, a source of water supply, water inlets interconnecting the source of water supply to the inlet to the water purification equipment, and water dispensing piping connecting the outlet passage from the water purification system to the gooseneck water dispensing pipe.

* * * * *